(12) United States Patent
Savarit et al.

(10) Patent No.: US 9,536,433 B2
(45) Date of Patent: Jan. 3, 2017

(54) METHOD AND DEVICE FOR DETERMINING THE OPTIMAL TURN DIRECTION OF AN AIRCRAFT

(71) Applicant: THALES, Courbevoie (FR)

(72) Inventors: Vincent Savarit, Toulouse (FR);
François Hoofd, Toulouse (FR);
Emmanuel Dewas, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/730,088

(22) Filed: Jun. 3, 2015

(65) Prior Publication Data
US 2015/0356874 A1 Dec. 10, 2015

(30) Foreign Application Priority Data
Jun. 6, 2014 (FR) ...................... 14 01300

(51) Int. Cl.
*G08G 5/00* (2006.01)
*G05D 1/02* (2006.01)

(52) U.S. Cl.
CPC .......... *G08G 5/0034* (2013.01); *G05D 1/0202* (2013.01); *G08G 5/0039* (2013.01); *G08G 5/0047* (2013.01)

(58) Field of Classification Search
CPC ...... G08G 5/00; G08G 5/0034; G08G 5/0039; G08G 5/0047; G05D 1/0202; G01C 21/20
USPC ........................................................ 701/528
See application file for complete search history.

(56) References Cited

U.S. PATENT DOCUMENTS

| 6,349,258 | B1   | 2/2002  | Bonhoure et al. |
|-----------|------|---------|-----------------|
| 6,424,889 | B1   | 7/2002  | Bonhoure et al. |
| 7,269,486 | B2   | 9/2007  | Artini          |
| 8,234,068 | B1 * | 7/2012  | Young ................... G01C 21/00 244/175 |
| 8,818,576 | B2 * | 8/2014  | Maldonado ............ G06Q 10/06 701/10 |
| 8,897,935 | B2 * | 11/2014 | Meunier .............. G01C 23/005 340/947 |
| 8,930,130 | B2 * | 1/2015  | Courteville ............ G01C 23/00 701/120 |

(Continued)

FOREIGN PATENT DOCUMENTS

EP 1598719 A1 11/2005
FR 2787895 A1 6/2000
(Continued)

*Primary Examiner* — Atul Trivedi
(74) *Attorney, Agent, or Firm* — Baker & Hostetler LLP

(57) ABSTRACT

A method determines the optimal turn direction of an aircraft among two directions, right and left, following a lateral trajectory to join an arrival straight charted by an angle of arrival, based on a departure point and angle of departure defining a departure straight oriented along movement of the aircraft, the direction defined by a respectively positive or negative optimal turn sign, comprising: determining a conventional departure sign of the departure point; determining a center value of an angle of change of course equal to the difference between the angle of arrival and angle of departure referred back between −180° and +180°, the center value exhibiting a logical sign corresponding to the center value sign of the angle of change of course; determining the sign of the optimal turn based on comparison between the departure sign and the logical sign, the sign of the optimal turn defining optimal turn direction.

19 Claims, 15 Drawing Sheets

(56) References Cited

U.S. PATENT DOCUMENTS

| | | | |
|---|---|---|---|
| 8,977,411 B2* | 3/2015 | Magana Casado | G08G 5/0013 701/120 |
| 2006/0089760 A1* | 4/2006 | Love | G08G 5/0039 701/4 |
| 2007/0241935 A1* | 10/2007 | Pepitone | G05D 1/0083 340/958 |
| 2008/0262665 A1* | 10/2008 | Coulmeau | G08G 5/0039 701/16 |
| 2008/0300739 A1* | 12/2008 | Coulmeau | G01C 21/00 701/8 |
| 2008/0312779 A1* | 12/2008 | Sacle | G01C 23/005 701/7 |
| 2009/0082955 A1* | 3/2009 | Sacle | G08G 5/0034 701/467 |
| 2009/0150008 A1* | 6/2009 | Villaume | G08G 5/065 701/3 |
| 2009/0319100 A1* | 12/2009 | Kale | G08G 5/0013 701/4 |
| 2010/0100308 A1* | 4/2010 | Coulmeau | G08G 5/006 701/122 |
| 2010/0217510 A1* | 8/2010 | Deker | G08G 5/045 701/120 |
| 2010/0305781 A1* | 12/2010 | Felix | G05D 1/101 701/3 |
| 2012/0150426 A1* | 6/2012 | Conway | G08G 5/0026 701/120 |
| 2012/0158220 A1* | 6/2012 | Accardo | G05D 1/0646 701/15 |
| 2013/0085672 A1* | 4/2013 | Stewart | G08G 5/003 701/528 |
| 2013/0317739 A1* | 11/2013 | Coulmeau | G05D 1/101 701/465 |
| 2014/0012500 A1* | 1/2014 | Savarit | G08G 5/0039 701/527 |
| 2015/0268048 A1* | 9/2015 | Seastrand | G01C 21/20 701/528 |

FOREIGN PATENT DOCUMENTS

| | | |
|---|---|---|
| FR | 2789771 A1 | 8/2000 |
| FR | 2916287 A1 | 11/2008 |
| WO | WO2008054914 A2 | 5/2008 |

* cited by examiner

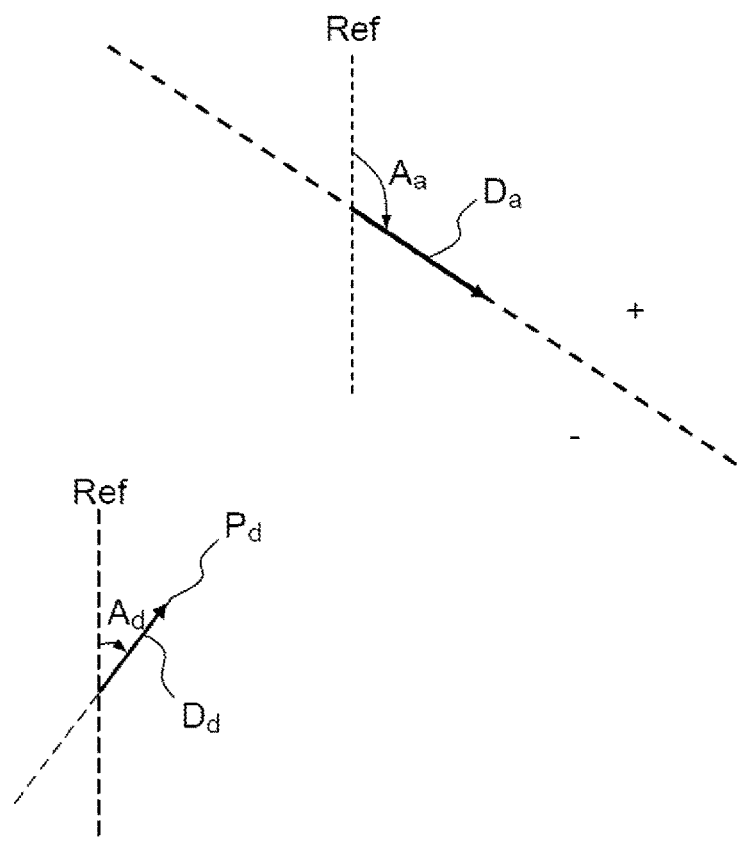
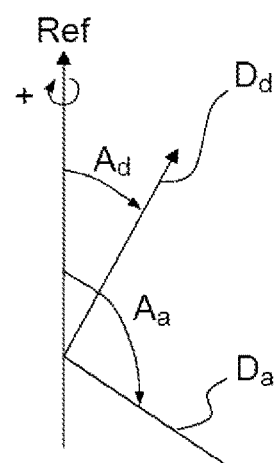
FIG.2a
FIG.2b

METHOD AND DEVICE FOR DETERMINING THE OPTIMAL TURN DIRECTION OF AN AIRCRAFT

CROSS-REFERENCE TO RELATED APPLICATION

This application claims priority to foreign French patent application No. FR 1401300, filed on Jun. 6, 2014, the disclosure of which is incorporated by reference in its entirety.

FIELD OF THE INVENTION

The present invention relates to a method for computing continuous geometric lateral trajectories between a departure point and an arrival straight. It applies notably to the field of avionics, and more particularly to the flight management devices customarily referred to by the acronym FMS standing for the expression "Flight Management System".

BACKGROUND

Most current aircraft possess a flight management system, for example of the FMS type, the acronym standing for the term "Flight Management System". These systems allow navigational aid, by displaying information useful to pilots, or else by communicating flight parameters to an automatic piloting system.

Notably, a system of FMS type allows a pilot or another qualified person, to input, pre-flight, a flight plan defined by a departure point of the flight plan, an arrival point of the flight plan, and a series of passing points or waypoints, customarily designated by the abbreviation WPT. All these points can be chosen from among points predefined in a navigation database, and which correspond to airports, radionavigation beacons, etc. The points can also be defined manually by their geographical coordinates and optionally their altitude.

The passing points can be input through a dedicated interface, for example a keyboard or a touchscreen, or else by transferring data from an external device.

A flight plan then consists of a succession of segments, or "legs" according to the terminology customarily employed in this technical field.

Other data can be entered into the flight management system, notably data relating to the aircraft's load plan and to the quantity of fuel aboard.

When the aircraft is in flight, the flight management system precisely evaluates the position of the aircraft and the uncertainty in this item of data, by centralizing the data originating from the various positioning devices, such as the satellite-based geo-positioning receiver, the radionavigation devices: for example DME, NDB and VOR, the inertial platform, etc.

A screen allows the pilots to view the current position of the aircraft, as well as the route followed by it, and the closest passing points, the whole on a map background making it possible to simultaneously display other flight parameters and distinctive points. The information viewed allows notably the pilots to adjust flight parameters, such as heading, thrust, altitude, rates of climb or of descent, etc. or else simply to check the proper progress of the flight if the aircraft is piloted in an automatic manner. The computer of the flight management system makes it possible to determine an optimal flight geometry, notably in the sense of a reduction in operating costs related to fuel consumption.

FIG. 1 presents a summary diagram illustrating the structure of a flight management system of FMS type, known from the prior art.

A system of FMS type 100 has a man-machine interface 120 comprising for example a keyboard and a display screen, or else simply a touch-sensitive display screen, as well as at least the following functions, described in the aforementioned ARINC 702 standard:

Navigation (LOCNAV) 101, for performing the optimal location of the aircraft as a function of the geo-location means 130 such as satellite-based or GPS or GALILEO geo-positioning, VHF radionavigation beacons and inertial platforms. This module communicates with the aforementioned geo-location devices;

Flight plan (FPLN) 102, for inputting the geographical elements constituting the skeleton of the route to be followed, such as the points imposed by the departure and arrival procedures, the waypoints, the air corridors (or "airways" as they are commonly known);

Navigation database (NAVDB) 103, for constructing geographical routes and procedures with the help of data included in the bases relating to the points, beacons, interception legs or altitude legs, etc;

Performance database (PRFDB) 104, containing the craft's aerodynamic and engine parameters;

Lateral trajectory (TRAJ) 105, for constructing a continuous trajectory on the basis of the points of the flight plan, complying with the performance of the aircraft and the confinement constraints (RNP);

Predictions (PRED) 106, for constructing an optimized vertical profile on the lateral and vertical trajectory. The functions forming the subject of the present invention affect this part of the computer;

Guidance (GUID) 107, for guiding in the lateral and vertical planes the aircraft on its three-dimensional trajectory, while optimizing its speed. In an aircraft equipped with an automatic piloting device 110, the latter can exchange information with the guidance module 107;

Digital data link (DATALINK) 108 for communicating with the control centres and the various other aircraft 109.

The flight plan is entered by the pilot, or else by data link, with the help of data contained in the navigation database. A flight plan typically consists of a succession of segments, customarily designated by the name "legs", which are formed of a termination and of a geometry, for example a geometry of turn type, or else of straight line type as great circle or rhumb line. The various types of legs are defined in the ARINC 424 international standard.

The pilot thereafter inputs the parameters of the aircraft: mass, flight plan, span of cruising levels, as well as a or a plurality of optimization criteria, such as the CI. These inputs allow the modules TRAJ 105 and PRED 106 to compute respectively the lateral trajectory and the vertical profile, that is to say the flight profile in terms of altitude and speed, which for example minimizes the optimization criterion.

The lateral trajectory of the aircraft is thus computed from leg to leg while complying with a certain number of conventions.

For example, for safety reasons, ARINC 424 makes provision, when a change of course (that is to say a change of track) between two consecutive legs of the flight plan is too big (typically greater than 135°), to impose a track for joining the following leg by imposing a turn direction of the aircraft or "Forced Turn Direction" as it is commonly referred to.

Moreover, when stringing the legs together, certain transitions also exhibit a "forced" direction or "Forced Turn Direction". Thus, the stringing together of leg n and leg n+1 must absolutely be performed by a trajectory complying with an imposed turn direction.

When there is no "Forced Turn Direction" between a leg and the following one, the FMS according to the prior art computes a joining trajectory comprising a turning of the aircraft according to a turn direction dubbed the logical direction or "Logical Turn Direction" (LTD). The LTD is determined in a basic manner, it is related directly and solely to the change of track between the legs.

There exist other situations in which for diverse reasons the aircraft has quit its flight plan and is therefore flying a trajectory outside of the initially computed lateral trajectory. To join the flight plan, the FMS then computes a trajectory for joining an arrival leg on the basis of the current position of the aircraft. In this case also the FMS chooses an initial turn according to the LTD direction.

We shall firstly explain in FIGS. 2a and 2b certain conventions making it possible to define the parameters necessary for a proper understanding of the computation of the LTD according to the prior art.

In FIG. 2a, a departure leg is defined by a departure point Pd and a track according to the direction of movement of the aircraft, corresponding to an oriented straight Dd charted by an angle of departure Ad defined with respect to a reference track Ref, typically North. By convention, the angle is considered positive clockwise, and lies between 0° and 360°. This departure point Pd can be a leg n when computing a lateral trajectory according to a predetermined flight plan, or the current position of the aircraft when computing a joining trajectory of an aircraft that has quitted its flight plan and wishes to join it at the level of a given arrival leg.

For the computation of the trajectory for joining the following leg or arrival leg, the FMS according to the prior art takes into consideration only the straight oriented in the desired direction of arrival of the aircraft on this leg, dubbed the arrival straight Da, without considering the exact position of the arrival point Pa corresponding to the geographical coordinates of the navigation point associated with the leg.

FIG. 2b explains the geometric situation of the departure and arrival legs according to the above conventions.

The system computes a joining trajectory so that an aircraft situated at Pd and flying according to a track corresponding to the angle of departure Ad, joins the straight Da. This trajectory begins with a turning of the aircraft and continues with a typically straight part which intersects the straight Da according to a joining angle AR. Typically the capture of the arrival straight Da is done according to a joining angle of 45° for a civil aeroplane. This angle may reach 90° for a fighter plane capable of performing tight turns. Likewise for flight time optimization reasons, the value of 45° can be decreased in zones of light air traffic.

The direction of a turn is left if the aircraft banks to its left and right if it banks to its right. By convention, a sign is allotted to the direction of the turn: a turn to the left (anti-clockwise) is negative, a turn to the right (clockwise) is positive.

The principle of computing the LTD is illustrated in FIG. 3 for various configurations of departure and arrival courses. The LTD ("Logical Turn direction") is related directly to the change of track between the legs, that is to say it is dependent only on the angle between Ad and Aa. This angle between Aa and Ad is customarily dubbed the angle of change of course or "Track Change" as it is commonly referred to.

The LTD corresponds to the turn direction which minimizes the amplitude of the change of track from Ad to Aa. The LTD is defined by a sign, positive when it is right (clockwise) and negative when it is left (anti-clockwise). Stated otherwise, the sign of the LTD corresponds to the sign of the difference Aa−Ad, if necessary converted so that this difference is referred back between −180° and +180° (smaller angle in absolute value between Ad and Aa):

For 0<Aa−Ad<180°, sign of LTD=+

For −180°<Aa−Ad<0°, sign of LTD=−

Thus, according to the prior art the system always chooses joining according to the smallest, in absolute value, "track change" angle, doing so whatever the position Pd of the aircraft with respect to the arrival straight Da.

FIG. 4 illustrates an example in which the direction of the logical turn LTD, computed by the system to join the straight Da, is left, i.e. negative (LTD=−). This logical direction LTD determined by the system is independent of the position of Pd with respect to the straight Da, as illustrated in FIG. 4. The trajectory 40 is the computed lateral trajectory of the aircraft when the departure point Pd is situated on the right of the arrival straight Da and the trajectory 41 is the computed lateral trajectory of the aircraft when the departure point Pd is situated on the left of the arrival straight Da. These two computed lateral trajectories 40 and 41 both begin with a left turn.

Thus the computation of the LTD takes no account of the geometric characteristics of the flight plan, and more particularly of the position of the departure point Pd with respect to the arrival straight Da. This mode of computation thus presents the drawback of not corresponding, for certain geometries, to the natural direction that would be chosen by the pilot or to the direction minimizing the distance travelled by the aircraft to join the straight Da.

Moreover, for certain geometries, an example of which is illustrated in FIG. 5, the joining of the straight Da on the basis of the LTD computed is performed downstream of the arrival point Pa, since the position of the point Pa is not taken into account in the computation of the LTD. Let us consider that the point Pd and the angle Ad correspond to a leg n, and that the arrival point Pa and the angle of arrival Aa correspond to the leg n+1 following the leg n of a flight plan. After leg n+1, the aircraft must join leg n+2 and so on and so forth.

The FMS according to the prior art computes a joining trajectory 50 passing beyond the point Pa and directly joining leg n+2 see n+3 of the flight plan. This computed trajectory is not satisfactory since it is not slaved sufficiently to the flight plan and hinders the pilots as well as the air traffic control.

SUMMARY OF THE INVENTION

An aim of the present invention is to alleviate the aforementioned drawbacks, by proposing a method for determining the optimal turn direction between a departure point and a departure course and an arrival straight taking into account the position of the departure point with respect to the arrival straight.

According to one aspect the invention relates to a method for determining the optimal turn direction of an aircraft defined with respect to its movement, from among two directions, right and left, the aircraft following a lateral trajectory so as to join an arrival straight oriented according to the desired direction of movement of the aircraft and charted by an angle of arrival on the basis of a departure point and of an angle of departure defining a departure straight oriented in the direction of movement of the aircraft, the right or left direction of the optimal turn with respect to the movement of the aircraft being conventionally defined by a respectively positive or negative optimal turn sign, the said method comprising the steps consisting in:

determining a conventional departure sign of the departure point with respect to the oriented arrival straight, the departure sign being positive or negative when the departure point is situated respectively on the left or on the right of the oriented arrival straight, determining a centred value of an angle of change of course equal to the difference between the angle of arrival and the angle of departure referred back between −180° and +180°, the said centred value exhibiting a logical sign corresponding to the sign of the centred value of the angle of change of course, determining the sign of the optimal turn on the basis of the comparison between the departure sign and the logical sign, the sign of the optimal turn defining the optimal turn direction.

According to a variant, the step of determining the sign of the optimal turn comprises the sub-step consisting in comparing the departure sign of the departure point and the logical sign, when the signs are different, the optimal turn sign is equal to the logical sign, when the signs are equal, the sign of the optimal turn is determined by a sub-step on the basis of the logical sign.

According to a first embodiment of this variant the sub-step of determining the sign of the optimal turn when the said signs are equal consists in assigning the opposite of the logical sign to the sign of the optimal turn.

According to a second embodiment the sub-step of determining the sign of the optimal turn when the said signs are equal is performed as a function of the absolute value of the centred value of the angle of change of course and/or of the distance between the departure point and the arrival straight.

According to a first variant of the second embodiment, the sub-step of determining the sign of the optimal turn when the said signs are equal comprises the sub-step consisting in:

comparing the absolute value of the centred value of the angle of change of course with an angle equal to 180° minus a joining angle lying between 10° and 90°, when the said absolute value is less than the difference between 180° and the said joining angle, the optimal turn sign is equal to the logical sign, when the said absolute value is greater than or equal to the difference between 180° and the said joining angle, the sign of the optimal turn is equal to the opposite of the logical sign.

According to a second variant of the second embodiment, the sub-step of determining the sign of the optimal turn when the said signs are equal comprises the sub-steps consisting in:

determining a distance between the departure point and the arrival straight by orthogonal projection of the departure point onto the arrival straight, comparing the distance between the departure point and the arrival straight and a joining distance, when the distance between the departure point and the arrival straight is less than the joining distance, the sign of the optimal turn is equal to the logical sign, when the distance between the departure point and the arrival straight is greater than or equal to the joining distance, the sign of the optimal turn is equal to the opposite of the logical sign.

According to a third variant of the second embodiment the sub-step of determining the sign of the optimal turn, when the said signs are equal and when on output from the comparison step the absolute value is greater than or equal to the difference between 180° and the joining angle, comprises the sub-steps consisting in:

determining a distance between the departure point and the arrival straight by orthogonal projection of the departure point onto the arrival straight, comparing the distance between the departure point and the arrival straight and a joining distance, when the distance between the departure point and the arrival straight is less than the joining distance, the sign of the optimal turn is equal to the logical sign, when the distance between the departure point and the arrival straight is greater than or equal to the joining distance, the sign of the optimal turn is equal to the opposite of the logical sign.

According to an example, the joining angle is equal to 45°.

According to one embodiment the joining distance is computed by the following formula:

$$Dist-r=Rv*(1+\sin\alpha),$$

Rv is a turning radius of the transition and $\alpha$ is the centred value of the angle of change of course TCc.

BRIEF DESCRIPTION OF THE DRAWINGS

Other characteristics, aims and advantages of the present invention will become apparent on reading the detailed description which follows and with regard to the appended drawings given by way of nonlimiting examples and in which:

FIGS. 2a and 2b already cited illustrate conventions making it possible to define parameters necessary for the understanding of the computation of the "Logic Turn Dir" or LTD according to the prior art.

DETAILED DESCRIPTION

Figure 6:
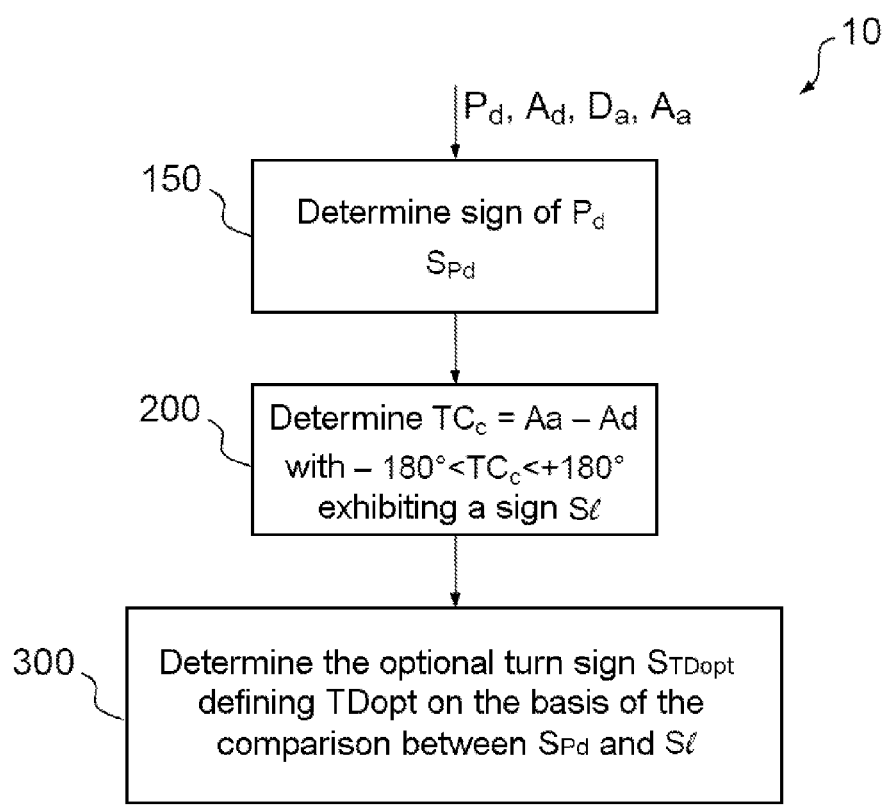
FIG. 6 describes the method for determining the optimal turn direction according to the invention.

FIG. 6 describes the method 10 according to the invention. The method 10 determines the optimal turn direction TDopt of an aircraft defined with respect to its movement, from among two directions, right and left. A leftward turn signifies that the aircraft banks to its left and a rightward turn that the aircraft banks to its right. The method applies to an aircraft theoretically situated at a departure point Pd and following an oriented route on an angle of departure Ad defining a departure straight Dd oriented in the direction of movement of the aircraft. The aircraft follows a lateral trajectory to join an arrival straight Da oriented according to the desired direction of movement of the aircraft on the straight Da having regard to the operational need and charted by an angle of arrival Aa. The angles of departure Ad and of arrival Aa are defined with respect to a reference track Ref, typically North, and are preferably considered positive clockwise, and lie between 0° and 360°.

The right or left direction of the optimal turn TDopt with respect to the movement of the aircraft is conventionally defined by a respectively positive + or negative − optimal turn sign $S_{TDopt}$. The method 10 according to the invention determines the sign of TDopt, and therefore TDopt itself by application of the convention:

$S_{TDopt}$=+, TDopt=towards the right $S_{TDopt}$=−, TDopt=towards the left.

The method 10 according to the invention comprises the following steps.

A step 150 consists in determining a conventional departure sign $S_{Pd}$ of the departure point Pd with respect to the oriented arrival straight Da. The departure sign is positive when the departure point Pd is situated on the left of the oriented arrival straight Da and negative when the departure point Pd is situated on the right of the arrival straight. This convention is illustrated in FIG. 2a.

The space is indeed conventionally divided into two parts, a positive part situated on the left of the oriented straight Da, a negative part situated to its right. The sign of the point Pd makes it possible to characterize its position with respect to oriented straight Da.

A step 200 consists in determining a centred value TCc of the angle of change of course equal to the difference between the angle of arrival Aa and the angle of departure Ad referred back between −180° and +180°. TCc=value of (Aa−Ad) lying between −180° and +180°.

The centred value TCc exhibits a logical sign SI corresponding to the sign of the centred value TCc of the angle of change of course.

The logical sign SI corresponds to the LTD defined according to the prior art.

A step 300 determines the sign of the optimal turn $S_{TDopt}$ on the basis of the comparison between the departure sign $S_{Pd}$ and the logical sign SI, the sign of the optimal turn $S_{TDopt}$ defining the optimal turn direction TDopt, as explained hereinabove.

The inventors have established that situations existed for which the choice of the LTD was not relevant, and that it was firstly appropriate to take account of the position of the departure point Pd with respect to the straight Da by way of its conventional sign $S_{Pd}$.

The inventors have thus established that as a function of the comparison between $S_{Pd}$ and the logical sign SI, either the sign of the optimal turn TDopt is equal to LTD, or it is equal to its opposite.

Stated otherwise the method 10 according to the invention introduces a new parameter $S_{Pd}$ and a new step of comparison 300 between the logical sign SI equal to the LTD that would have been systematically chosen by an FMS according to the prior art computing the lateral trajectory, and this sign $S_{Pd}$.

An advantage of the method is that it introduces into the determination of the optimal turn direction TDopt a parameter dependent on the position, to the left or to the right, of the departure point with respect to the arrival straight Da, that is to say it takes account in a simple manner of the geometry of the flight plan of the aircraft.

Taking this parameter into account makes it possible to choose a turn direction opposite to the LTD in certain situations for which this choice is more appropriate, as explained further on.

Figure 7:
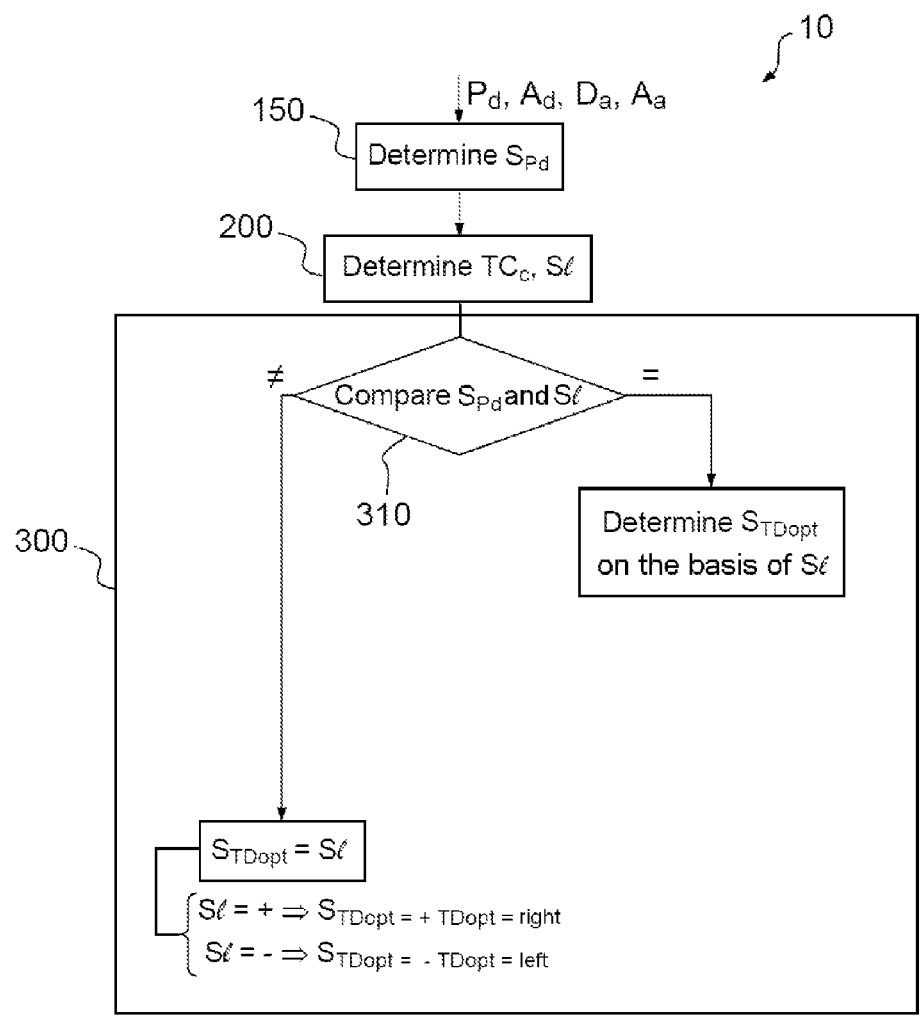
FIG. 7 describes a variant of the method according to the invention.

FIG. 7 describes a variant of the method 10 according to the invention.

According to this variant, step 300 of determining the sign of the optimal turn $S_{TDopt}$ comprises a sub-step 310 consisting in comparing the departure sign $S_{Pd}$ of the departure point Pd and the logical sign SI, and in defining the optimal turn turn sign $S_{TDopt}$ according to the following logic:

when the signs are different, the optimal turn sign is equal to the logical sign SI:

$S_{TDopt}$=SI=LTD when the signs are equal, the sign of the optimal turn $S_{TDopt}$ is determined by a sub-step 320 on the basis of the logical sign SI.

The inventors have thus established that when the signs are different, the choice of LTD is a correct choice, and that the situations posing a problem correspond to the case for which the signs $S_{Pd}$ and SI are equal.

The inventors have also fine-tuned two embodiments for carrying out the computation of the sign of TDopt on the basis of SI.

Figure 8A:
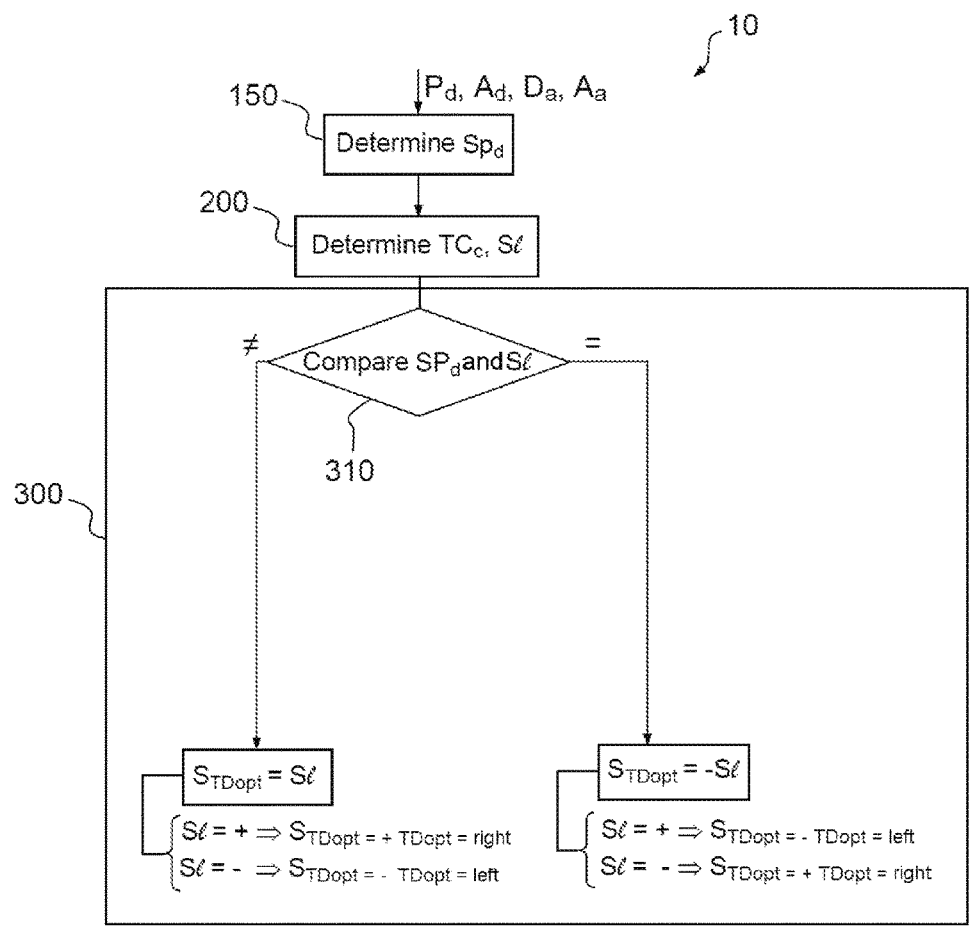
FIG. 8A describes a first embodiment of the invention.

According to a first embodiment illustrated in FIG. 8A, the sub-step 320 of determining the sign of the optimal turn $S_{TDopt}$ when the signs are equal, consists in assigning the opposite of the logical sign SI to the sign of the optimal turn $S_{TDopt}$.

This entails a first choice of very simple logic.

Figure 8B:
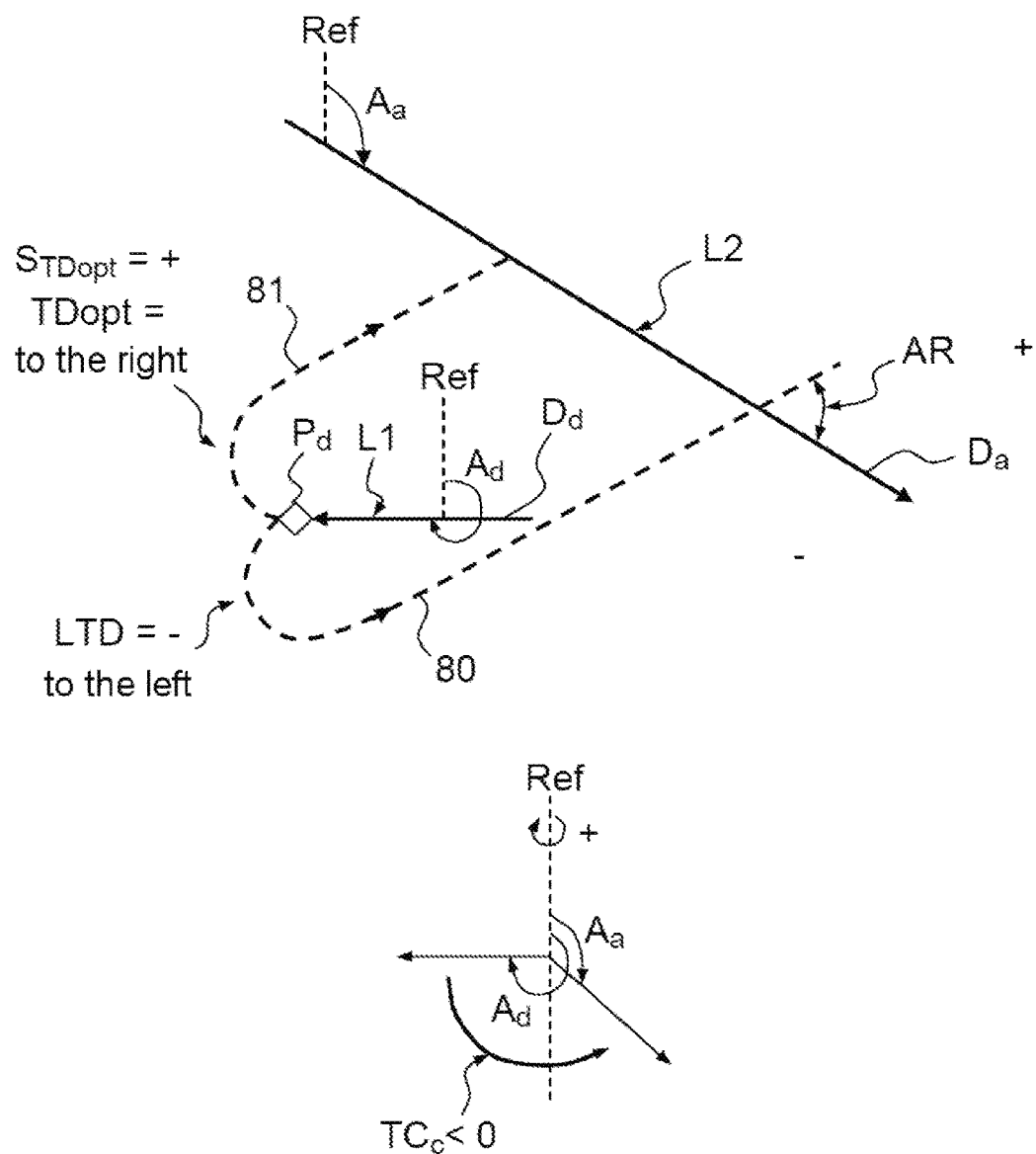
FIG. 8B illustrates a flight geometry for which the optimal turn direction according to the invention is different from the turn direction determined by the prior art.

FIG. 8B illustrates this situation with an exemplary flight geometry in respect of an aircraft flying a flight plan comprising the legs. The FMS system seeks to compute a lateral trajectory from the first leg L1 corresponding to the position Pd according to a course Ad, to the following leg or second leg L2 exhibiting a course Aa according to the arrival straight Da.

The logical sign SI is negative since the value of TCc is negative.

A system according to the prior art computes a joining trajectory 80 comprising a leftward turn direction LTD.

The sign of the point Pd is negative, and therefore the sign of Pd $S_{Pd}$ and the logical sign are both negative. The method 10 according to the invention determines a sign $S_{TDopt}$ of the optimal turn direction TDopt positive, i.e. a rightward optimal direction with a joining trajectory 81. It is noted in the figure that this trajectory 81 is shorter, and this may save fuel and above all allows a better slaving of the trajectory flown by the aeroplane to the flight plan defined by the pilot and/or the air traffic control.

Figure 9:
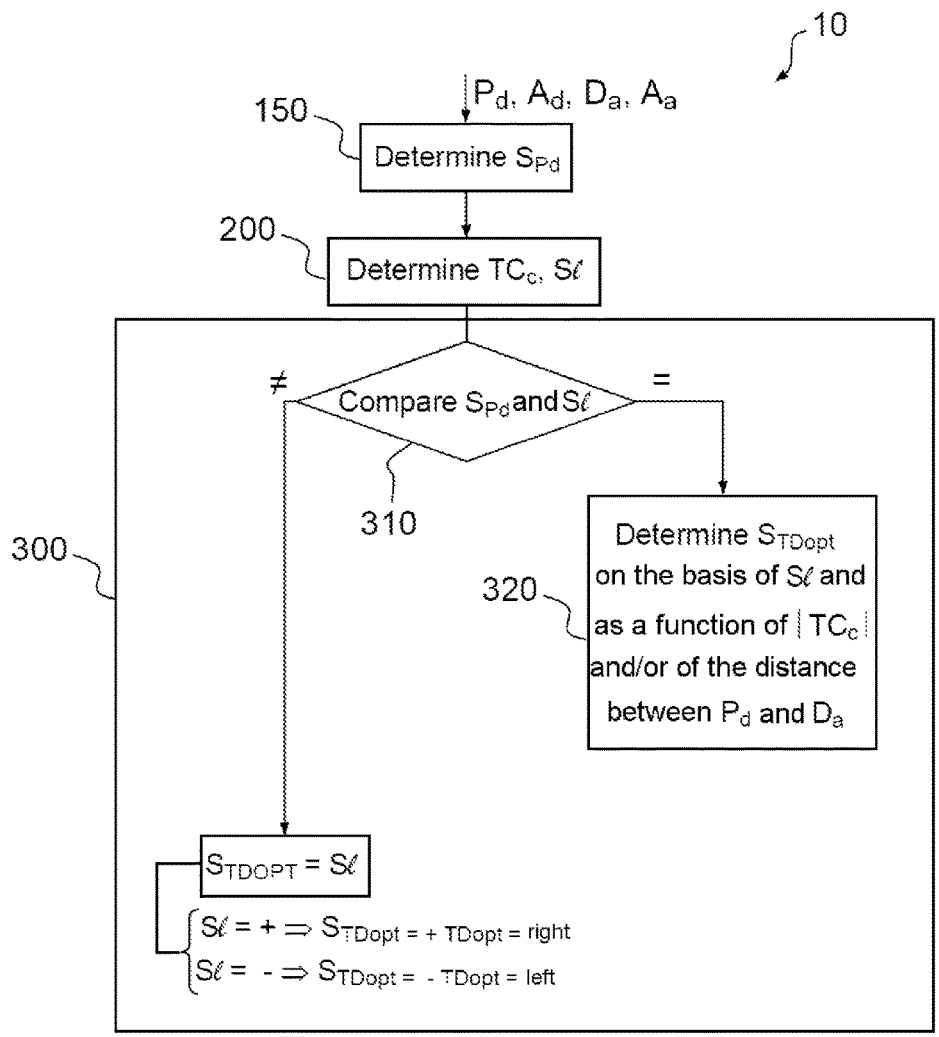
FIG. 9 describes a second embodiment of the invention.

According to a second embodiment illustrated in FIG. 9, the sub-step 320 of determining the sign of the optimal turn $S_{TDopt}$ when the signs are equal is performed as a function of the absolute value of the centred value of the angle of change of course TCc and/or of the distance Dist between the departure point Pd and the arrival straight Da.

The introduction of two criteria, one dependent on ITCcI and the other on Dist, these criteria being able to be used independently or cumulatively, makes it possible to refine the logic for determining TDopt.

Figure 10:
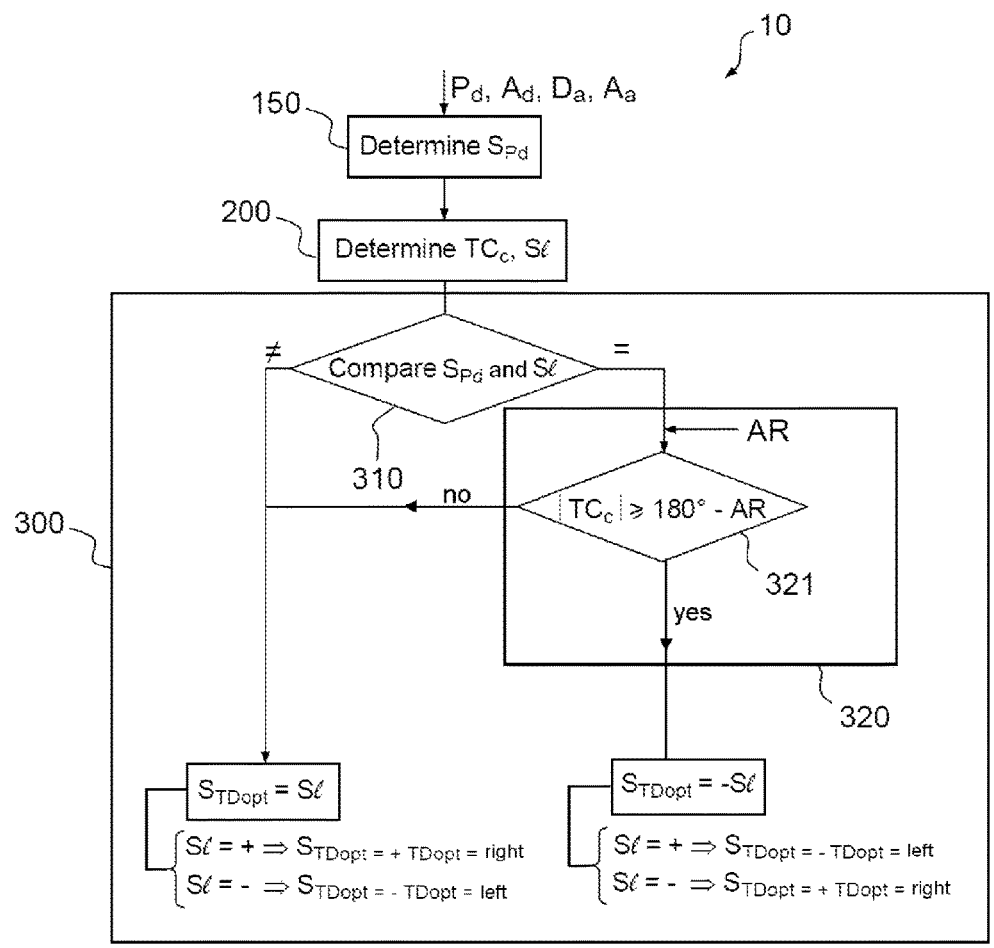
FIG. 10 describes a first variant of the second embodiment of the invention.

FIG. 10 describes a first variant of the second embodiment.

According to this variant, the sub-step 320 of determining the sign of the optimal turn $S_{TDopt}$ when the signs are equal comprises a sub-step 321 which compares the absolute value of the centred value of the angle of change of course ITCcI with an angle equal to 180° minus a joining angle AR lying between 10° and 90°.

A joining angle AR corresponds to the angle according to which an aircraft must join a straight line in space corresponding to its desired trajectory, such as the arrival straight Da and is illustrated in FIG. 8B.

The joining angle corresponds to the angle of capture of the second leg L2 from the first leg L1. This angle can vary between 10° and 90° according to systems and according to operational needs. For aeroplanes flying commercial flights, AR is preferably equal to 45°.

When ITCcI is less than the difference between 180° and the joining angle, the optimal turn sign $S_{TDopt}$ is equal to the logical sign SI:

ITCcI<180°−AR, $S_{TDopt}$=SI.

When ITCcI is greater than or equal to the difference between 180° and the joining angle, the sign of the optimal turn $S_{TDopt}$ is equal to the opposite of the logical sign:

ITCcI≥180°−AR, $S_{TDopt}$=−SI.

This criterion makes it possible to take account of the ability of the aircraft to readily capture the arrival straight Da with the trajectory computed with a TDopt determined with the previous logic. Indeed when TCc is small, whatever its sign, there is little benefit (unless obliged by procedure) in computing a trajectory in the non-logical direction.

Figure 11:
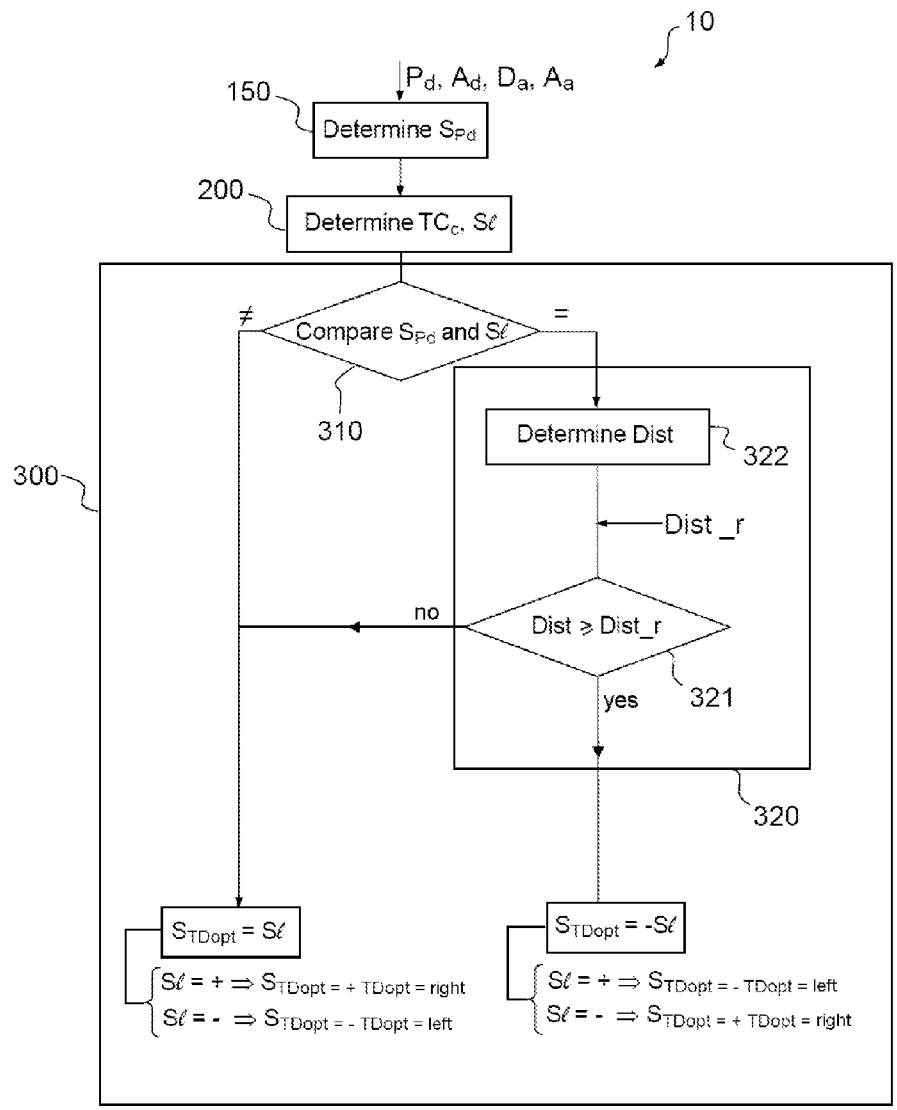
FIG. 11 describes a second variant of the second embodiment of the invention.

FIG. 11 describes a second variant of the second embodiment.

According to this variant, the sub-step 320 of determining the sign of the optimal turn $S_{TDopt}$ when the signs are equal comprises a sub-step 322 consisting in determining 322 a distance Dist between the departure point Pd and the arrival straight Da by orthogonal projection of the departure point onto the arrival straight.

Next a sub-step 323 compares the distance Dist between the departure point and the arrival straight with a predetermined joining distance Dist-r:

When the distance between the departure point and the arrival straight is less than the joining distance Dist-r, the sign of the optimal turn $S_{TDopt}$ is equal to the logical sign SI:

Dist<Dist-r $S_{TDopt}$=SI.

When the distance between the departure point and the arrival straight Dist is greater than or equal to the joining distance Dist-r, the sign of the optimal turn $S_{TDopt}$ is equal to the opposite of the logical sign SI:

Dist≥Dist-r $S_{TDopt}$=−SI.

Figure 12A:
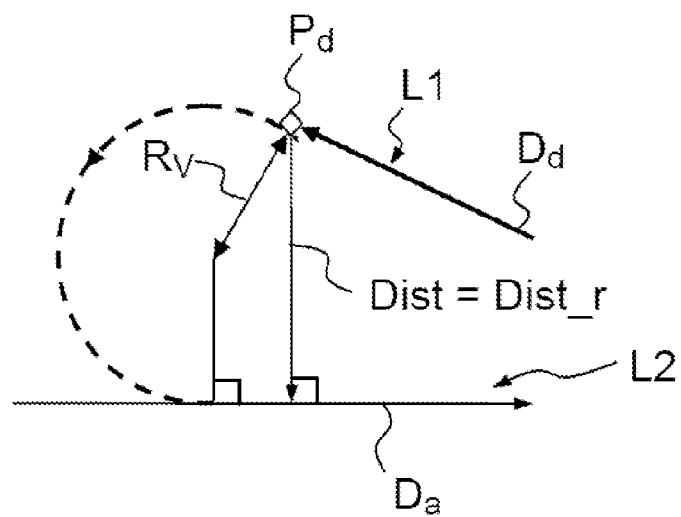
FIGS. 12a and 12b illustrate the notion of turning radius of an aircraft.
Figure 12B:
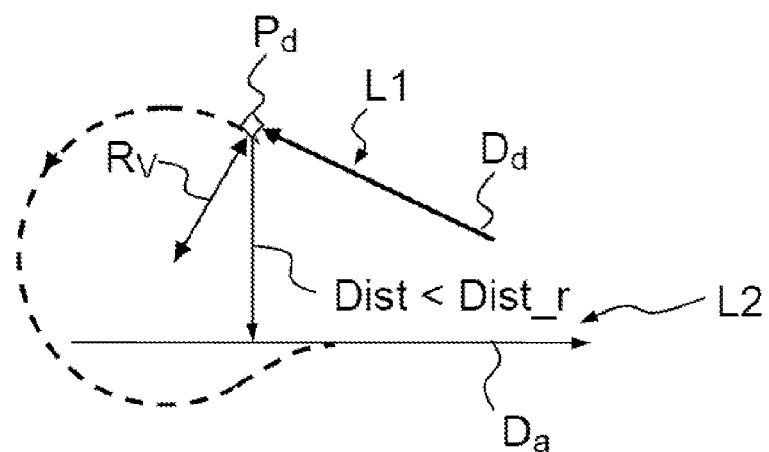

This condition will be better understood with the aid of FIGS. 12a and 12b, which illustrate the fact that an aircraft carrying out a turn is limited by a turning radius Rv predetermined as a function of the type of aircraft, of the type of flight, of the operational need etc.

If the point Pd is sufficiently far from the straight Da (Dist≥Dist-r) the aircraft can join the latter directly by carrying out the turn. The limit case is illustrated in FIG. 12a.

If point Pd is too close to the straight Da, the aircraft will "overshoot" the straight Da while performing its turn, this situation being illustrated in FIG. 12b.

The minimum distance of the point Pd from the straight Da making it possible to avoid "overshoot" corresponds to the distance Dist-r.

The aforementioned condition makes it possible to eliminate overshoot situations, such that Dist<Dist-r, when they must not be accepted. The turn according to the desired track is accepted only if the aircraft is able to join the arrival straight or second leg L2 directly, without overshooting.

A minimum distance Dist-r can also be chosen by providing a margin.

Conventionally, the minimum distance Dist-r is computed as a function of the turning radius Rv of the transition according to the formula:

Dist-r=Rv*(1+sinα),

With α=TCc.

Figure 13:
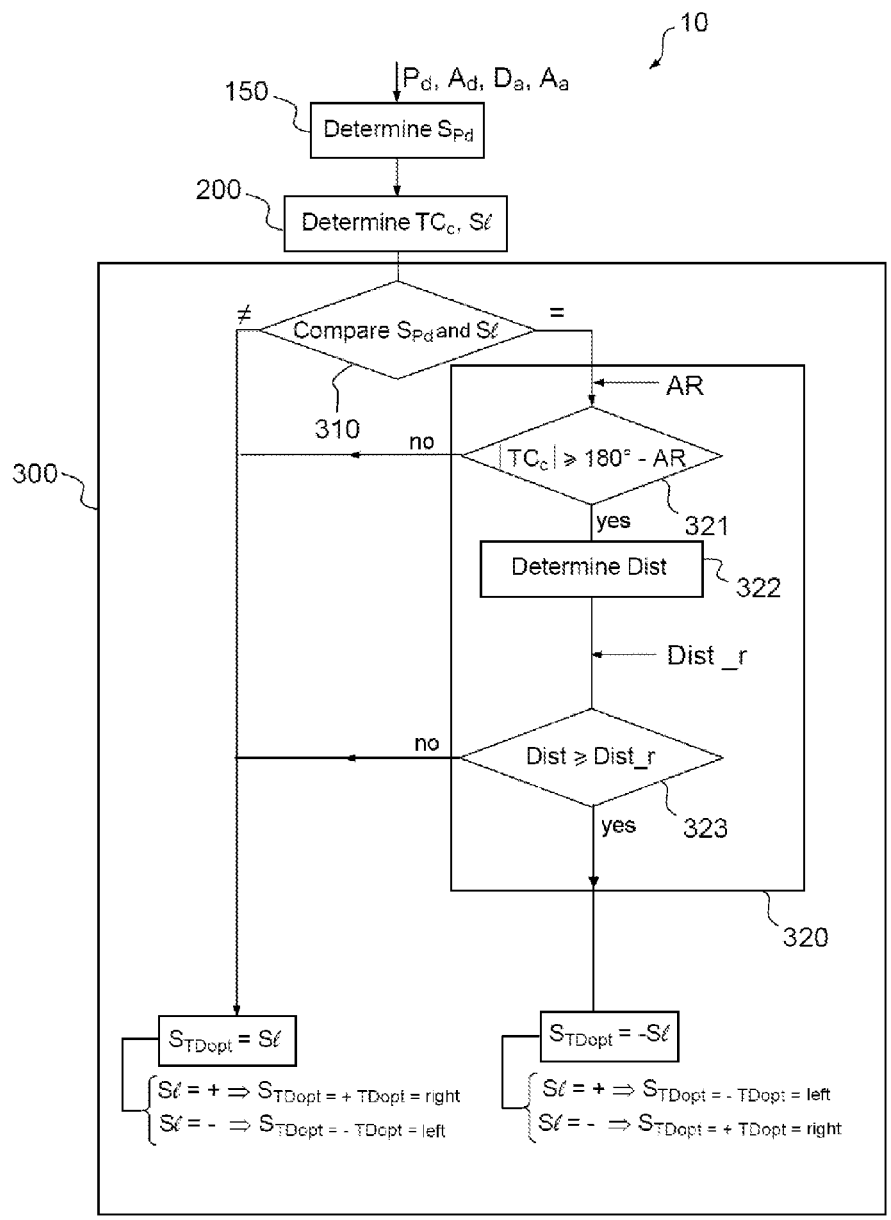
FIG. 13 describes a third variant of the second embodiment of the invention.

According to a third variant illustrated in FIG. 13, the two conditions are applied cumulatively. When the signs are equal and when on output from the comparison step 321 the absolute value is greater than or equal to the difference between 180° and the joining angle, the sub-step 320 of determining the sign of the optimal turn $S_{TDopt}$ comprises:
 a sub-step 322 consisting in determining a distance Dist between the departure point Pd and the arrival straight Da by orthogonal projection of the departure point onto the arrival straight,
 a sub-step 323 consisting in comparing 323 the distance Dist between the departure point and the arrival straight and a joining distance Dist-r:
 When the distance between the departure point and the arrival straight is less than the joining distance Dist-r, the sign of the optimal turn $S_{TDopt}$ is equal to the logical sign SI.
 When the distance between the departure point and the arrival straight is greater than or equal to the joining distance Dist-r, the sign of the optimal turn $S_{TDopt}$ is equal to the opposite of the logical sign SI.

Cumulatively taking into account the position of the departure point Pd/first leg L1 (sign of Pd), the distance of Pd from the straight Da/leg L2 and the value of the angle of change of course TCc for the determination of the optimal turn direction TDopt makes it possible to finely identify situations for which the LTD according to the prior art does not correspond to the correct choice, and therefore to determine an optimal turn direction suited in any circumstances to the aircraft's flight conditions.

Figure 14:
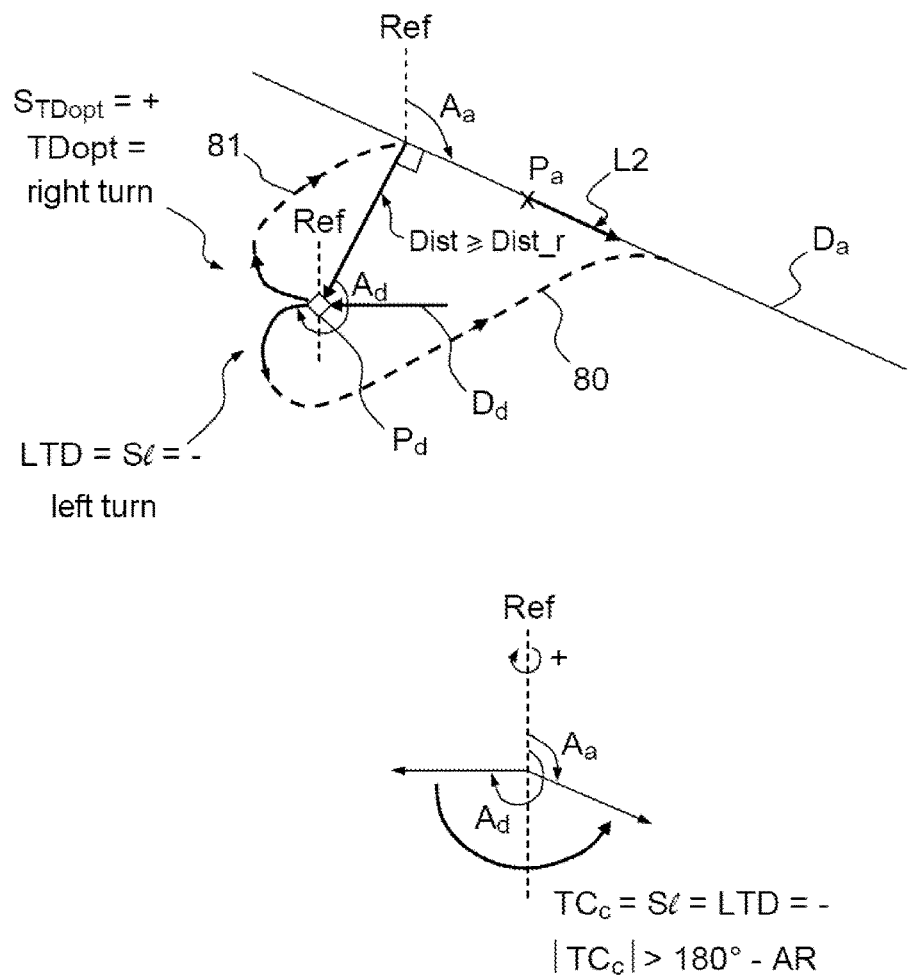
FIG. 14 reveals an advantage of the method according to the invention.

FIG. 14 returns to the situation of FIG. 8B and reveals another advantage of the method according to the invention.

Figure 1:
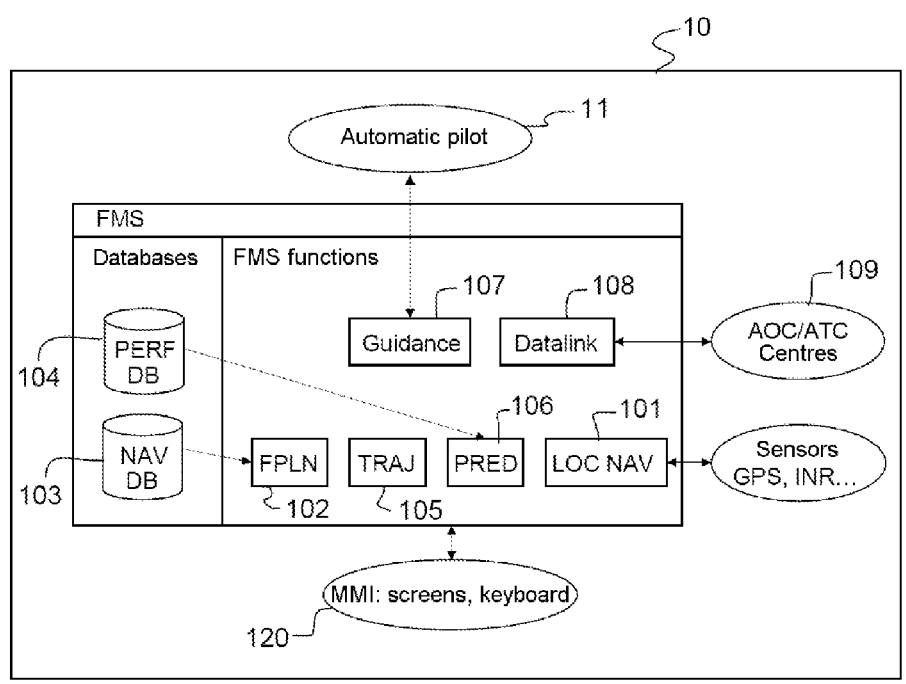
FIG. 1 already cited presents a summary diagram illustrating the structure of a flight management system of FMS type according to the prior art.
Figure 3:
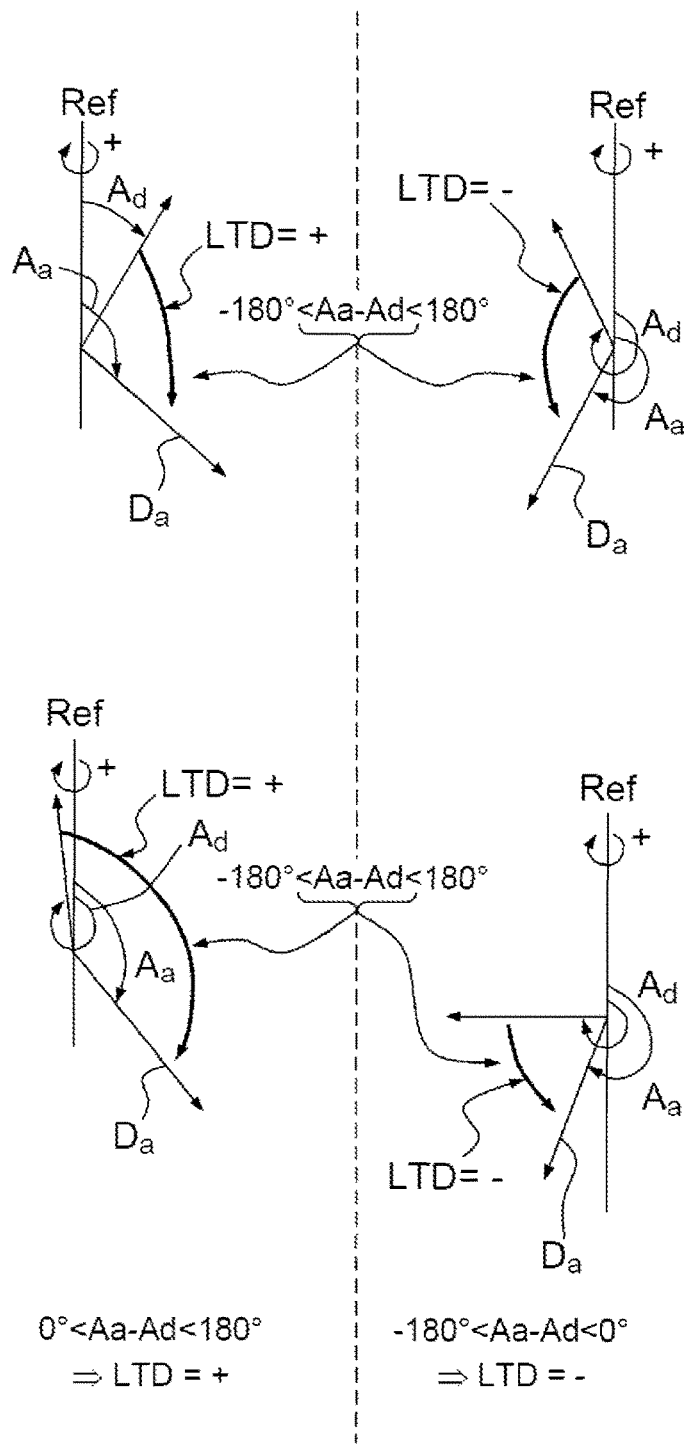
FIG. 3 already cited describes the principle of computing the LTD for various departure course configurations.
Figure 4:
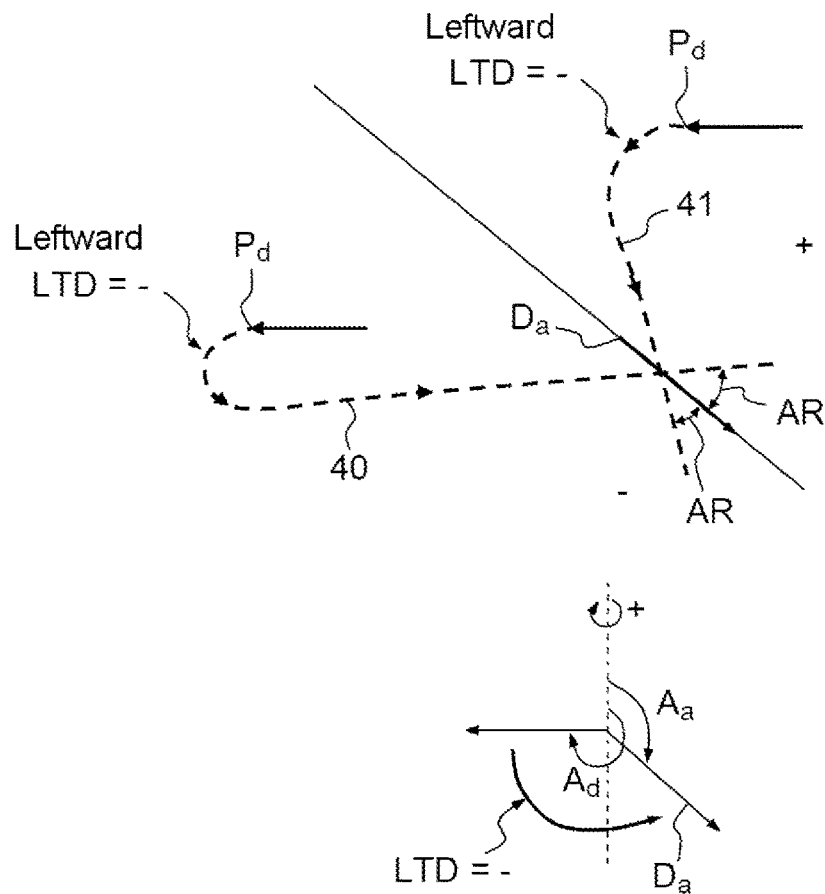
FIG. 4 already cited illustrates an example in which the turn direction determined according to the prior art is left.
Figure 5:
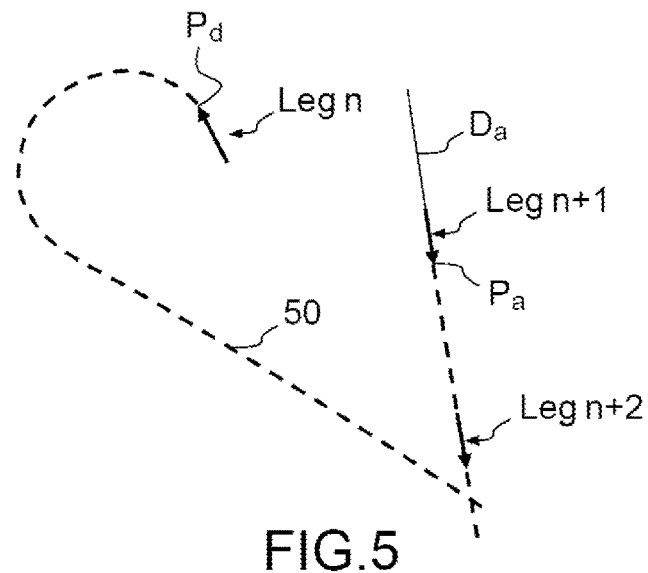
FIG. 5 already cited illustrates a particular flight geometry.

The system according to the prior art does not take into account the geographical position of the desired arrival point Pa, i.e. the arrival waypoint WPa corresponding to the leg 2. As described in FIG. 5 the system computes a long trajectory 50 at the aircraft which is rather unsatisfactory since it is far from the initial flight plan.

The trajectory 81 obtained on the basis of the turn direction determined by the method according to the invention joins further upstream the arrival straight Da, and therefore makes it possible to comply with the arrival point Pa.

According to another aspect, the invention relates to a method for determining a lateral trajectory of an aircraft using the above-described method for determining the turn direction according to the invention. The trajectory can be computed in various situations and according to diverse variants of operational implementations, explained hereinbelow by way of example.

A first variant relates to a method for determining a lateral trajectory of an aircraft, computed on the basis of a plurality of successively inserted sections of a flight plan, a transition between two successive sections requiring in certain cases that the aircraft turn according to a turn direction, the method comprising the steps consisting in, for each transition between a preceding section and a following section requiring a turn: —determining the optimal turn direction TDopt of the said transition by the method described hereinabove, the preceding section exhibiting the departure point Pd and the angle of departure Ad, the following section exhibiting the angle of arrival Aa according to the desired direction of movement, —computing the lateral trajectory of the transition between the preceding section and the following section on the basis of the optimal turn direction TDopt computed at the previous step.

According to one embodiment of this first variant, the optimal turn direction TDopt is determined by the method hereinabove for the transitions of the flight plan not exhibiting a turn direction predefined in a navigation database.

Figure 15:
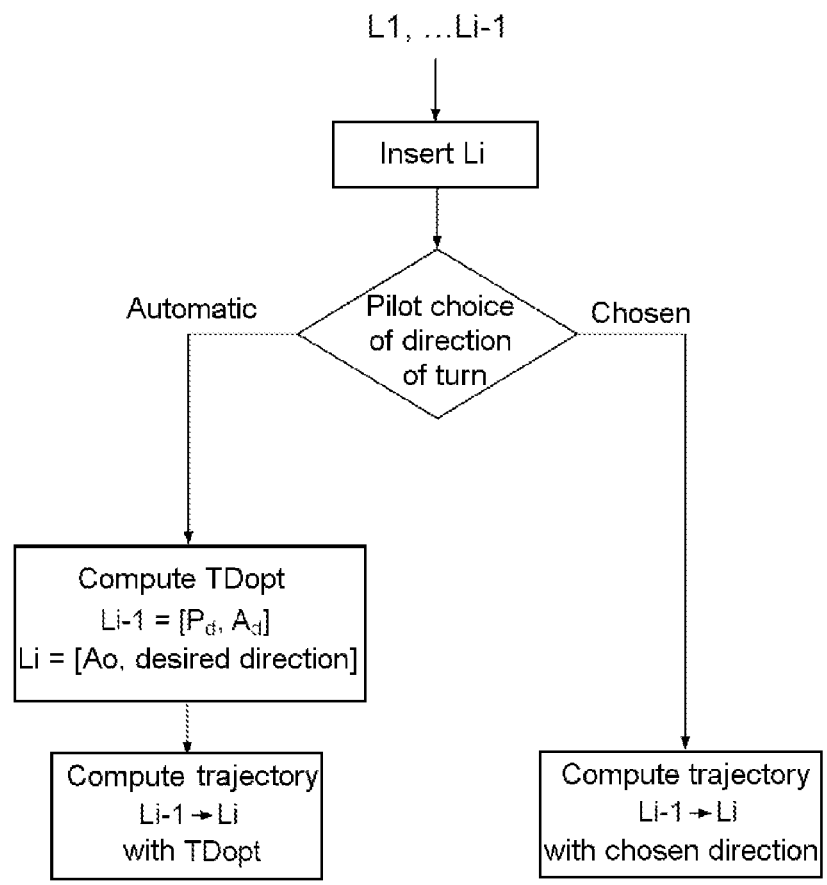
FIG. 15 illustrates a trajectory computation method using the method for determining the optimal turn direction according to the invention.

A second variant illustrated in FIG. 15 relates to a method for determining a lateral trajectory of an aircraft, computed on the basis of a plurality of successively inserted sections of a flight plan, a transition between two successive sections requiring in certain cases that the aircraft turn according to a turn direction, the method comprising the steps consisting in, upon the insertion of a section for which it is necessary that the aircraft turn in order to join the said section from the preceding section:

asking the pilot to choose the turn direction to be taken into account, when the pilot chooses the turn direction from among right and left, computing the lateral trajectory of the transition between the preceding section and the inserted section with the chosen turn direction, when the pilot chooses an automatic determination of the turn direction:

determining the optimal turn direction with the method hereinabove, the preceding section exhibiting the departure point Pd and the angle of departure Ad, the inserted section exhibiting the angle of arrival Aa according to the desired direction of movement, computing the lateral trajectory of the transition between the preceding section and the following section on the basis of the optimal turn direction computed at the previous step.

Note that the pilot may not wish to choose the turn direction, this amounting to engaging the "automatic" mode by default, the pilot being able at any moment to decide to force the choice to a value or to let the system choose.

According to one embodiment of this second variant, the pilot is interrogated regarding the turn direction to be taken into account when the turn direction is not predefined in the navigation database.

A third variant relates to a method for determining a lateral joining trajectory of an aircraft that has quitted its initial flight plan comprising a plurality of successive sections, the joining trajectory being computed between a current position of the aircraft and an arrival section chosen by the pilot from among the sections of the initial flight plan, the trajectory being determined on the basis of an optimal turn direction TDopt computed by the method hereinabove, the current position corresponding to the departure point Pd, the aircraft flying according to an angle of departure Ad, the arrival section exhibiting the angle of arrival according to the desired direction of movement.

According to another aspect, the invention relates to a device 160 for determining the optimal turn direction TDopt of an aircraft defined with respect to its movement, from among two directions, right and left.

The aircraft follows a lateral trajectory to join an arrival straight Da oriented according to the desired direction of movement of the aircraft and charted by an angle of arrival Aa, on the basis of a departure point Pd and of an angle of departure Ad defining a departure straight Dd oriented in the direction of movement of the aircraft.

The right or left direction of the optimal turn TDopt with respect to the movement of the aircraft is conventionally defined by a respectively positive or negative optimal turn sign $S_{TDopt}$.

Figure 16:
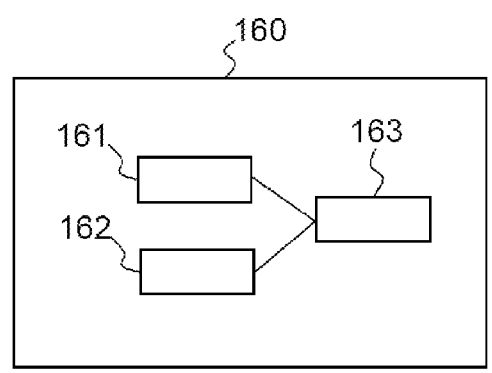
FIG. 16 shows diagrammatically a device for determining the optimal turn direction according to another aspect of the invention.

The device, illustrated in FIG. 16 comprises:

a module 161 for determining a conventional departure sign $S_{Pd}$ of the departure point Pd with respect to the oriented arrival straight Da, the departure sign being positive or negative when the departure point is situated respectively on the left or on the right of the oriented arrival straight Da, a module 162 for determining a centred value TCc of an angle of change of course equal to the difference between the angle of arrival Aa and the angle of departure Ad referred back between $-180°$ and $+180°$, the centred value TCc exhibiting a logical sign SI corresponding to the sign of the centred value TCc of the angle of change of course, a module 163 for determining a sign of the optimal turn $S_{TDopt}$ on the basis of the comparison between the departure sign $S_{Pd}$ and the logical sign SI, the sign of the optimal turn $S_{TDopt}$ defining the optimal turn direction TDopt.

According to one embodiment, the module 160 is integrated into a flight management system FMS, typically in its TRAJ module 105.

The invention thus also relates to a flight management system of an aircraft of FMS type comprising the device 160 according to the invention.

According to a last aspect, the invention relates to a computer program product comprising code instructions making it possible to perform the steps of the method according to the invention.

The invention claimed is:

1. A method for determining a lateral trajectory followed by an aircraft executed by a flight management system, the lateral trajectory being computed on a basis of a plurality of successively inserted sections of a flight plan and of aircraft parameters input by a pilot, a transition between two successive inserted sections requiring in certain cases that the aircraft turns according to a turn direction, said method comprising for at least one inserted section requiring said turn, a step of determining an optimal turn direction method of the aircraft defined with respect to its movement, from among two directions, right and left, the aircraft following the lateral trajectory so as to join an arrival straight oriented according to the desired direction of movement of the aircraft and charted by an angle of arrival, on a basis of a departure point and of an angle of departure defining a departure straight oriented in the direction of movement of the aircraft, the right or left direction of the optimal turn with respect to the movement of the aircraft being conventionally defined by a respectively positive or negative optimal turn sign, the said step of determining the optimal turn direction method comprising the steps:

determining a conventional departure sign of the departure point with respect to the oriented arrival straight, the departure sign being positive or negative when the departure point is situated respectively on the left or on the right of the oriented arrival straight, determining a centered value of an angle of change of course equal to a difference between the angle of arrival and the angle of departure referred back between −180° and +180°, the said centered value exhibiting a logical sign corresponding to the sign of the centered value of the angle of change of course, determining the sign of the optimal turn on the basis of the comparison between the departure sign and the logical sign, the said sign of the optimal turn defining the optimal turn direction, and the method further comprising the steps of computing the lateral trajectory and proposing to the pilot to insert the computed trajectory in a flight plan.

2. The method according to claim 1, in which step of determining the sign of the optimal turn comprises the sub-step consisting in comparing the departure sign of the departure point and the logical sign, when the said signs are different, the optimal turn sign is equal to the logical sign, when the signs are equal, the sign of the optimal turn is determined by a sub-step on the basis of the logical sign.

3. The method according to claim 2, in which the sub-step of determining the sign of the optimal turn when the said signs are equal consists in assigning the opposite of the logical sign to the sign of the optimal turn.

4. The method according to claim 2, in which the sub-step of determining the sign of the optimal turn when the said signs are equal is performed as a function of the absolute value of the centered value of the angle of change of course and/or of the distance between the departure point and the arrival straight.

5. The method according to claim 4, in which the sub-step of determining the sign of the optimal turn when the said signs are equal comprises the sub-step consisting in:

comparing the absolute value of the centered value of the angle of change of course with an angle equal to 180° minus a joining angle lying between 10° and 90°, when the said absolute value is less than the difference between 180° and the said joining angle, the optimal turn sign is equal to the logical sign, when the said absolute value is greater than or equal to the difference between 180° and the said joining angle, the sign of the optimal turn is equal to the opposite of the logical sign.

6. The method according to claim 5, in which the sub-step of determining the sign of the optimal turn, when the said signs are equal and when on output from the comparison step the said absolute value is greater than or equal to the difference between 180° and the said joining angle, comprises the sub-steps consisting in:

determining a distance between the departure point and the arrival straight by orthogonal projection of the departure point onto the arrival straight, comparing the distance between the departure point and the arrival straight and a joining distance, when the distance between the departure point and the arrival straight is less than the joining distance, the sign of the optimal turn is equal to the logical sign, when the distance between the departure point and the arrival straight is greater than or equal to the joining distance, the sign of the optimal turn is equal to the opposite of the logical sign.

7. The method according to claim 5, in which the joining angle is equal to 45°.

8. The method according to claim 4, in which the sub-step of determining the sign of the optimal turn when the said signs are equal comprises the sub-steps consisting in:

determining a distance between the departure point and the arrival straight by orthogonal projection of the departure point onto the arrival straight, comparing the distance between the departure point and the arrival straight and a joining distance, when the distance between the departure point and the arrival straight is less than the joining distance, the sign of the optimal turn is equal to the logical sign, when the distance between the departure point and the arrival straight is greater than or equal to the joining distance, the sign of the optimal turn is equal to the opposite of the logical sign.

9. The method according to claim 8, in which the joining distance (Dist-r) is computed by the following formula:

Dist-r=Rv*(1 +sinα), in which Rv is a turning radius of the transition and α is the centered value of the angle of change of course TCc.

10. The method according to claim 1, the method further comprising the steps of:

determining the optimal turn direction of the said transition for each transition between a preceding section and a following section requiring a turn, the preceding section exhibiting the departure point and the angle of departure, the following section exhibiting the angle of arrival according to the desired direction of movement, and computing the lateral trajectory of the transition between the preceding section and the following section on the basis of the optimal turn direction computed at the previous step.

11. A method for determining a lateral trajectory of an aircraft executed by a flight management system, the lateral trajectory being computed on the basis of a plurality of successively inserted sections of a flight plan, a transition between two successive sections requiring in certain cases that the aircraft turn according to a turn direction, the method comprising the steps consisting in, for each transition between a preceding section and a following section requiring a turn:

determining the optimal turn direction of the said transition by the method according to claim 1, the preceding section exhibiting the departure point and the angle of departure, the following section exhibiting the angle of arrival according to the desired direction of movement, computing the lateral trajectory of the transition between the preceding section and the following section on the basis of the optimal turn direction computed at the previous step, wherein the optimal turn direction is determined by the method according to claim 1 for the transitions of the flight plan not exhibiting a turn direction predefined in a navigation database.

12. The method according to claim 1, the method further comprising the steps consisting in, upon the insertion of a section for which it is necessary that the aircraft turn in order to join the said section from the preceding section:

asking the pilot to choose the turn direction to be taken into account, when the pilot chooses the turn direction from among right and left, computing the lateral trajectory of the transition between the preceding section and the inserted section with the chosen turn direction, when the pilot chooses an automatic determination of the turn direction:
determining the optimal turn direction according to claim 1, the preceding section exhibiting the departure point and the angle of departure, the inserted section exhibiting the angle of arrival according to the desired direction of movement, and
computing the lateral trajectory of the transition between the preceding section and the following section on the basis of the optimal turn direction computed at the previous step.

13. The method according to claim 12, in which the pilot is interrogated regarding the turn direction to be taken into account when the said turn direction is not predefined in a navigation database.

14. The method according to claim 1, the aircraft having quit its initial flight plan comprising a plurality of successive sections, the said joining trajectory being computed between a current position of the aircraft and an arrival section chosen by the pilot from among the sections of the initial flight plan, the said trajectory being determined on the basis of said step of determining an optimal turn direction according to claim 1, and the current position corresponding to the departure point, the aircraft flying according to an angle of departure, the arrival section exhibiting the angle of arrival according to the desired direction of movement.

15. A computer program product, the said computer program comprising code instructions making it possible to perform the steps of the method according to claim 1.

16. A flight management system configured to compute a lateral trajectory followed by an aircraft computed on a basis of a plurality of successively inserted sections of a flight plan and of aircraft parameters inserted by a pilot, a transition between two successive inserted sections requiring in certain cases that the aircraft turns according to a turn direction, said flight management system comprising a device for determining the optimal turn direction of an aircraft being defined with respect to its movement, from among two directions, right and left, the aircraft following the lateral trajectory so as to join an arrival straight oriented according to the desired direction of movement of the aircraft and charted by an angle of arrival, on a basis of a departure point and of an angle of departure defining a departure straight oriented in the direction of movement of the aircraft, the right or left direction of the optimal turn with respect to the movement of the aircraft being conventionally defined by a respectively positive or negative optimal turn sign, the said device comprising:

a module for determining a conventional departure sign of the departure point with respect to the oriented arrival straight, the departure sign being positive or negative when the departure point is situated respectively on the left or on the right of the oriented arrival straight, a module for determining a centered value of an angle of change of course equal to a difference between the angle of arrival and the angle of departure referred back between −180° and +180° , the said centered value exhibiting a logical sign corresponding to the sign of the centered value of the angle of change of course, and a module for determining a sign of the optimal turn on the basis of the comparison between the departure sign and the logical sign, the said sign of the optimal turn defining the optimal turn direction.

17. A method for determining a lateral trajectory followed by an aircraft executed by a flight management system, the lateral trajectory being computed on a basis of a plurality of successively inserted sections of a flight plan and of aircraft parameters input by a pilot, a transition between two successive inserted sections requiring in certain cases that the aircraft turns according to a turn direction, said method comprising for at least one inserted section requiring said turn, a step of determining an optimal turn direction method of the aircraft defined with respect to its movement, from among two directions, right and left, the aircraft following the lateral trajectory so as to join an arrival straight oriented according to the desired direction of movement of the aircraft and charted by an angle of arrival, on a basis of a departure point and of an angle of departure defining a departure straight oriented in the direction of movement of the aircraft, the right or left direction of the optimal turn with respect to the movement of the aircraft being defined by a respectively positive or negative optimal turn sign, the said step of determining the optimal turn direction method comprising the steps:

determining a conventional departure sign of the departure point with respect to the oriented arrival straight with the flight management system, the departure sign being positive or negative when the departure point is situated respectively on the left or on the right of the oriented arrival straight, determining a centered value of an angle of change of course equal to a difference between the angle of arrival and the angle of departure referred back between −180° and +180° with the flight management system, the said centered value exhibiting a logical sign corresponding to the sign of the centered value of the angle of change of course, determining the sign of the optimal turn on the basis of the comparison between the departure sign and the logical sign with the flight management system, the said sign of the optimal turn defining the optimal turn direction, and the method further comprising the steps of computing the lateral trajectory with the flight management system and proposing to the pilot to insert the computed trajectory in a flight plan utilizing the flight management system.

18. The method according to claim 17, in which step of determining the sign of the optimal turn comprises the sub-step consisting in comparing the departure sign of the departure point and the logical sign,
  when the said signs are different, the optimal turn sign is equal to the logical sign,
  when the signs are equal, the sign of the optimal turn is determined by a sub-step on the basis of the logical sign.

19. The method according to claim 18, in which the sub-step of determining the sign of the optimal turn when the said signs are equal consists in assigning the opposite of the logical sign to the sign of the optimal turn.

* * * * *